Jan. 19, 1954  W. R. ALEXANDER ET AL  2,666,429
MACHINE FOR THE CORRECTION OF POSTURE
AND NORMALIZATION OF WEIGHT

Filed March 6, 1950  8 Sheets-Sheet 1

*INVENTORS*
WM. R. ALEXANDER
OWEN E. WILLIAMS
HAROLD H. DAWSON
HOWARD K. BENTZ

By Jerome R. Cox
attorney

Jan. 19, 1954

W. R. ALEXANDER ET AL 2,666,429

MACHINE FOR THE CORRECTION OF POSTURE
AND NORMALIZATION OF WEIGHT

Filed March 6, 1950

INVENTORS
WM. R. ALEXANDER
OWEN E. WILLIAMS
HAROLD H. DAWSON
HOWARD K. BENTZ

By Jerome R Cox
attorney

INVENTORS
WM. R. ALEXANDER
OWEN E. WILLIAMS
HAROLD H. DAWSON
HOWARD K. BENTZ
By: Jerome R Cox
attorney Jan. 19, 1954 W. R. ALEXANDER ET AL 2,666,429
MACHINE FOR THE CORRECTION OF POSTURE
AND NORMALIZATION OF WEIGHT
Filed March 6, 1950 8 Sheets-Sheet 7

INVENTORS: WILLIAM R. ALEXANDER
OWEN E. WILLIAMS
HAROLD H. DAWSON
HOWARD K. BENTZ
BY Jerome R. Cox
attorney Jan. 19, 1954

W. R. ALEXANDER ET AL

2,666,429

MACHINE FOR THE CORRECTION OF POSTURE
AND NORMALIZATION OF WEIGHT

Filed March 6, 1950

INVENTORS: WILLIAM R. ALEXANDER
OWEN E. WILLIAMS
HAROLD H. DAWSON
HOWARD K. BENTZ

BY Jerome R. Cox
attorney

Patented Jan. 19, 1954

2,666,429

UNITED STATES PATENT OFFICE 2,666,429

MACHINE FOR THE CORRECTION OF POSTURE AND NORMALIZATION OF WEIGHT

William R. Alexander, Owen E. Williams, Harold H. Dawson, and Howard K. Bentz, Columbus, Ohio, assignors, by mesne assignments, to Lawrence L. Mack, Stamford, Conn.

Application March 6, 1950, Serial No. 147,812

16 Claims. (Cl. 128—33)

1

The invention illustrated by the disclosure of this application relates to methods and machines for the correction of posture and normalization of weight. The invention is illustrated by several embodiments of exercise tables on which patients repose.

Prior hereto it has been suggested that it would be advantageous (1) to induce improved circulation in patients by oscillation of a table or couch upon which the patient reposes; (2) give basic passive exercise to the pelvic region of a patient by massage thereof and by an alternate forward and backward movement thereof (3) alternately move one side of the buttocks forward while moving the other side back thus giving a twisting and massaging exercise which will tend to free the muscles and tendons of the sacro-iliac region and making it easier for the patient to assume a good posture and eventually overcome pelvic dip; (4) relax the muscles and tendons of the shoulders and back by pulling the rib cage up, releasing strain on the abdominal organs and allowing the shoulders to assume a balanced position; and (5) relax the muscles and ligaments of the shoulder and rib structure by moving one side forward at the same time the other side is moving backward and vice versa, in order to restore a proper and natural position skeletal structure of the upper body and promote a free respiratory action. However, no one has, prior to our invention, suggested that all of these objects could be accomplished upon a single exercise table.

One of the objects of our invention therefore is to provide methods and means whereby an oscillating movement of the whole body of a patient may be provided or optionally a pad member may supply oscillating movement and massage to a single portion of the body, as for example, the shoulders or buttocks.

A further object of our invention is the provision of a machine wherein a pair of pad members may be moved either in synchronism or alternately in opposite directions.

A further object of our invention is the provision of a machine having a pair of adjacent pads, having driving means for the pad members, and having linkage for transmitting power from the driving means to oscillate said pads concurrently in opposite directions.

A further object of our invention is the provision of a machine having a pair of body contacting pad members mounted for independent oscillating movement together with means for transmitting power to said members independently and concurrently in the same direction.

2

Features of our invention include: the provision of a main frame together with a cradle carrying a body supporting portion similar to a table or couch and means for oscillating the cradle and body supporting portion as a unit; a provision in one embodiment in connection with such a cradle of a pair of oscillating body contacting pad members movable relative to the cradle; the provision of means by which two cams automatically operate in phase when the motor is driving in one direction and operate out of phase when the motor is driving in the opposite direction; and a provision by which the contacting pad members may be spread or pushed closer together in order to become adjusted for the comfort of the patient.

Other objects and features of our invention will be apparent from a reading of the following specification and claims when taken in connection with the accompanying drawings which illustrate several embodiments of our invention.

Figure 1:
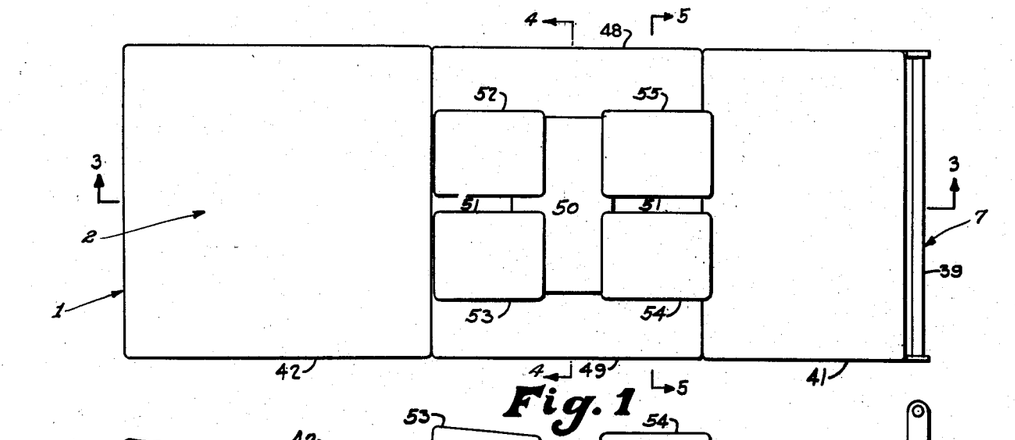
Fig. 1 is a view in plan of an exercise table embodying features of our invention and illustrating our invention.
Figure 2:
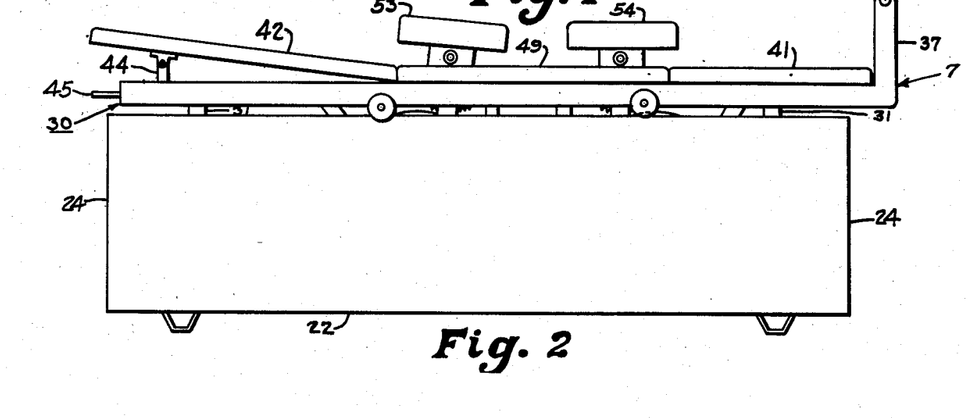
Fig. 2 is a view in side elevation of the table shown in Fig. 1.

We have shown in Figs. 1–16 inclusive an exercise table 1 having as indicated in Figs. 1 and 2 a body supporting surface 2 and body contacting members later more fully described. It is also provided with a hand grip arrangement generally designated 7 and has sides and ends secured to a main frame 10 (see Figs. 3 and 4).

Figure 3:
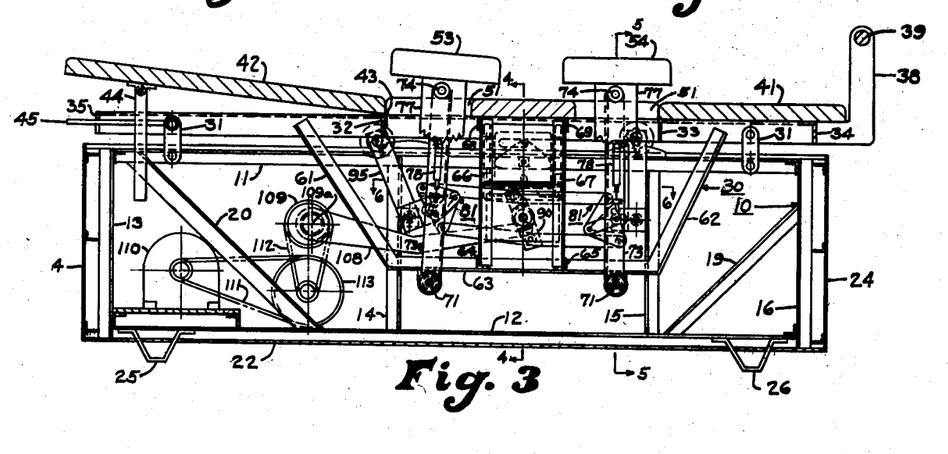
Fig. 3 is a view in vertical section taken substantially on the line 3—3 of Figs. 1 and 4.

Referring now for more details chiefly to Fig. 3, the main frame 10 is formed with top and bottom supporting frame members 11 and 12 (formed if desired of angle iron or of channel section) on each side. These members are connected by the uprights 13, 14, 15, 16; cross braces 17 and 18 (see Figs. 4 and 5); and diagonal braces 19 and 20. This frame may be enclosed on the bottom, sides and ends with panels 22, 23 and 24, respectively. Supports 25, 26, 27 and 28 connected to the bottom frame members 12 provide for positioning the frame on the floor.

Figure 4:
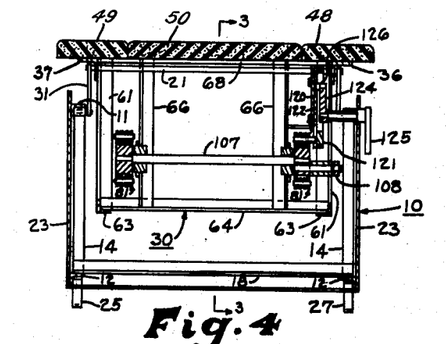
Fig. 4 is a view in vertical section taken substantially on the line 4—4 of Figs. 1 and 3.

A cradle, indicated generally at 30 in Figs. 2, 3, 4 and 5, is mounted for reciprocable movement in a substantially horizontal plane relative to the top of main frame 10. The cradle is pivotally connected to the frame 10 with four links 31. Two of these links are shown in Fig. 3. The other two of the links are similarly disposed on the opposite side of frame 10. The links pivot at their upper ends upon shafts 21 which extend through the ends of frame members 36 and 37. The cradle 30 is formed with cross members 32, 33, 34 and 35 (Fig. 3) connected at their ends with the longitudinally extending members 36 and 37 (Fig. 4).

The hand grip 7 consists of a pair of L-shaped uprights 38, one of which is connected to the forward ends of each of the members 36 and 37 and a cross rod 39. The uprights 38 support the cross rod 39 providing a handgrip and foot rest for the table which is utilized as will be later described.

We will now describe in detail the body supporting surface 2. Pad members 41 and 42 are supported on top of the cradle 30 and provide covers for the ends thereof. Pad 42, Fig. 3, is connected, with a hinge 43 at its inner end, to the cradle. The outer end of pad 42 is pivotally connected to the rod 44. This rod extends through an aperture in the lever 45 and is thus held in any desired position by frictional engagement therewith to provide for holding the outer end of pad 42 in any desired position of adjustment above the cradle 30. The pad members 41 and 42 are formed of a resilient material, such as cotton, foam or sponge rubber or any other desired upholstering material. The pads provide supports upon which the body of the patient rests when in a reclining position. Pad member 42 thus forms a head and neck rest for the patient when the feet are on the foot rest 39. The center portion of the cradle 30 is also covered on each side with pad members, as indicated at 48 and 49 in Fig. 1. A smaller, centrally positioned, pad member 50 is located between pad members 48 and 49 so as to leave two substantially rectangular openings 51 uncovered in the top of the cradle. The cradle 30 in addition to the frame members previously described includes diagonal end members 61 and 62 on each side. These members are connected at their upper ends to frame members 36 and 37 and at their lower ends with longitudinally extending frame members 63 on each side. Cross members 64 and 65, Fig. 3, tie between the members 63 from side to side and support vertically extending frame members 66 and 67 which in turn are connected to cross frame members 68 and 69 of the cradle.

We also provide means operable when the cradle is stationary to exercise individual portions of the body of the patient as may be desired. Four body contacting members are supported by the cradle 30 and movable therewith. Each of the body contacting members has at its top an upholstered pad such as the pads 52, 53, 54 and 55 respectively. It seems necessary only to describe in detail one pair of the body contacting member assemblies. The assemblies supporting the pads 54 and 55, for example, may be described since the other pair of assemblies supporting pads 52 and 53 are identical in construction and mounting. Shafts 71 are mounted between the frame members 63. These shafts are provided with a bearing 72 for each of the pad members, and each bearing supports a channel member 73 carrying the associated pad member at its upper end. The channel members are thus free to swing on shaft 71. The pad members are pivotally connected to the tops of the channel members 73, being carried on the rotatably mounted rods 74. A notched plate 77, which supports the pad on rod 74, extends downwardly on the sides of channel members 73. A spring controlled pawl 78 mounted on channel member 73 is positioned to engage the notches of plate 77 to provide for holding the pad in an adjusted position relative to the top of channel member 73. The pawl is controlled by means of a Bowden wire 79 the opposite end of which extends around to the front of the machine for the convenience of the operator.

Figure 6:
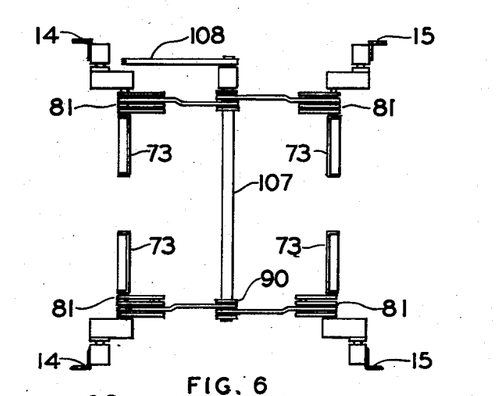
Fig. 6 is a fragmentary view in horizontal section taken substantially on the line 6—6 of Fig. 3, some parts having been omitted for the sake of clarity.
Figure 7:
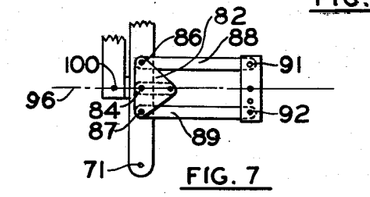
Fig. 7 is a diagrammatic view illustrating the operation of a linkage by which the drive of paddle levers used in the device may be accomplished, a floating driving link which is also used in the device being shown as set in a neutral or non-driving position.
Figure 8:
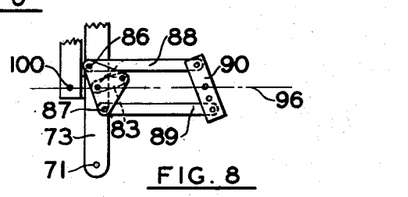
Fig. 8 is a view similar to Fig. 7 showing the effect of movement of a driving crank arm which is used in the device.

Power to reciprocate or swing the body contacting members and assemblies carrying respectively the pad members 52, 53, 54 and 55 in arcs is applied through the linkages indicated generally at 81. One of these linkages is shown more clearly in Figs. 14, 15 and 16. It includes a pivot member 82 in the form of a triangular shaped plate. A link 83 is pivotally connected at one end with a driving pin 84 which extends into the bushing 84a (Fig. 13) of the channel member 73 and at its other end is pivotally connected with a pin passing through one of the apices of plate 82, as indicated at 85. The other two apices of plate 82 are pivotally connected by pins 86 and 87 to the links 88 and 89 which in turn are pivotally connected to the crank arm 90, as indicated at 91 and 92 in Fig. 15. A similar pair of links are also connected to the ends of crank arm 90 and extend in the opposite direction from the direction of the links 88 and 89. This other pair of links are similarly connected to another pair of triangularly shaped plates each of which is connected to its associated oscillatable channel support member 73. Thus each of the four support members 73 shown in Fig. 6 is connected to one of the triangular shaped plates corresponding to plate 82 shown in Figs. 7–16. This other pair of links is shown in Fig. 14 and is designated 88a and 89a.

Figure 5:
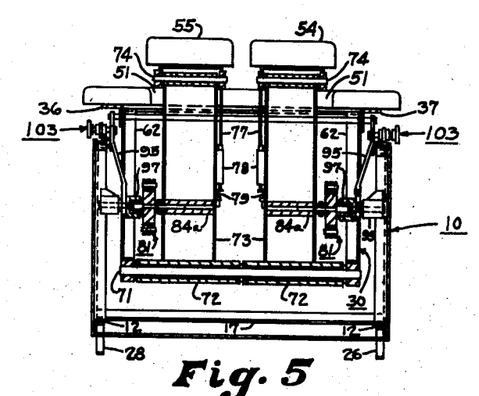
Fig. 5 is a view in vertical section taken substantially on the line 5—5 of Figs. 1 and 3.
Figure 13:
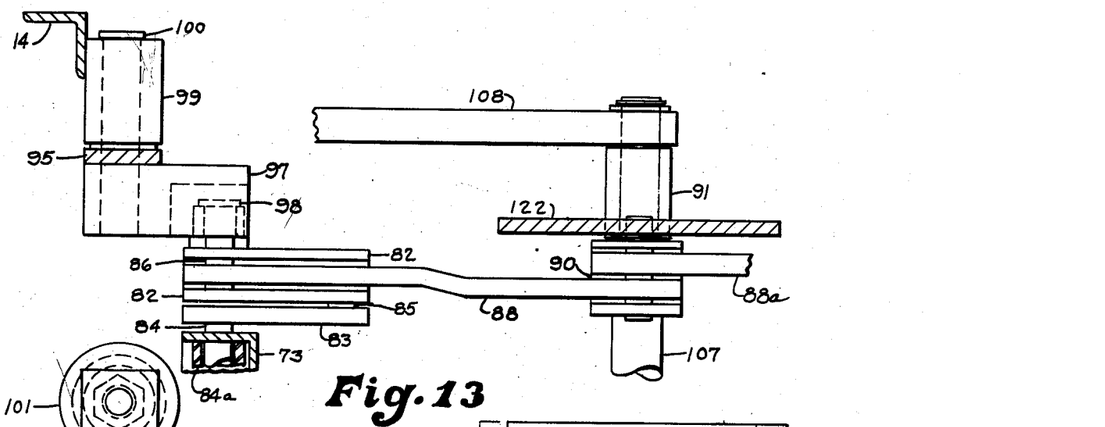
Fig. 13 is a fragmentary view in horizontal section on a greatly enlarged scale showing further details of the driving mechanism.

We provide means for activating the mechanism so that optionally any one or more of the assemblies which carry the pad members 52, 53, 54 or 55 may be oscillated as the operator desires. The pivotally mounted arm 95 provides for swinging, i. e. raising or lowering, the triangular plate 82 with respect to the horizontal plane indicated at 96 in Fig. 15. This arm, as shown in Figs. 13 and 14, is formed with an offset block portion 97 which is open at one end to form a guideway for pin 98. This pin is carried on plate 82 midway between the pins 86 and 87. Pin 98 is free to move in the guideway, as indicated by the full and dotted line positions shown in Figs. 14 to 16. A block 99 on the frame upright 14 carries a pin 100 which provides a pivot support holding the lower end of arm 95, i. e. block 97. The upper end of arm 95 is provided with a roller 101 which runs on the arcuate track 102. A threaded finger control, indicated generally at 103 in Fig. 5, provides for clamping the roller to the track to hold the roller in any desired position.

Figure 14:
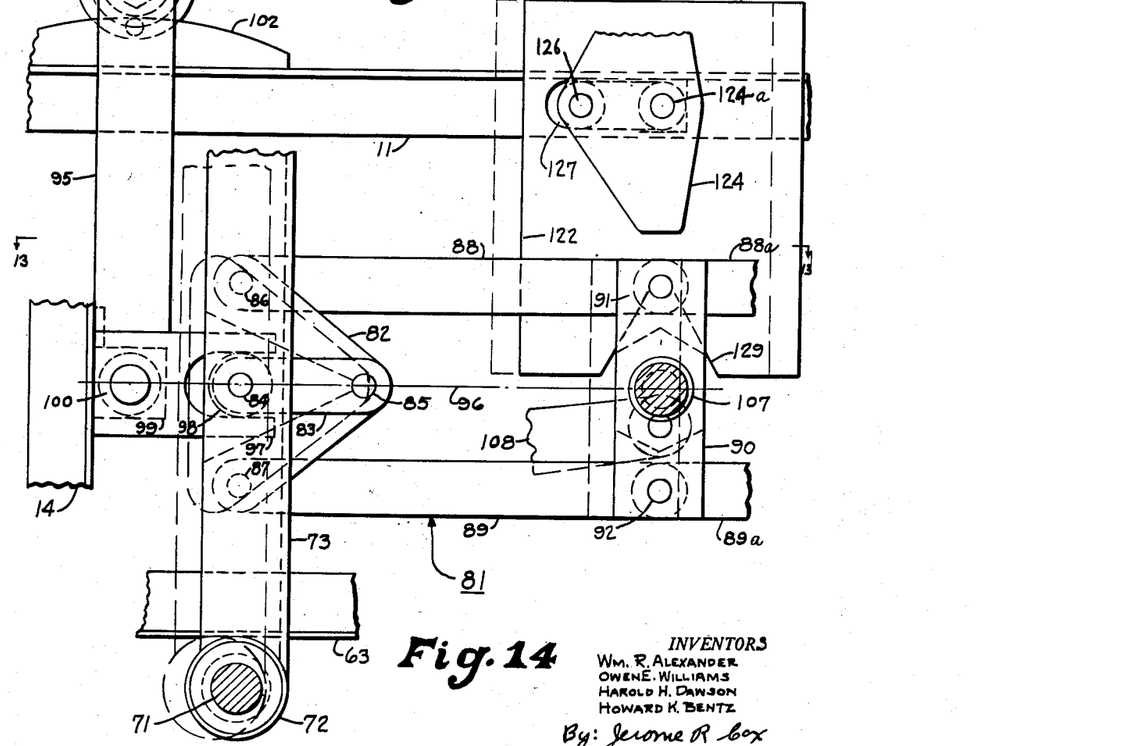
Fig. 14 is a fragmentary view in vertical section on an enlarged scale, showing further details of the driving linkage mechanism and details of the locking plate which is in position so that the body supporting portion of the table as a whole may be driven.
Figure 15:
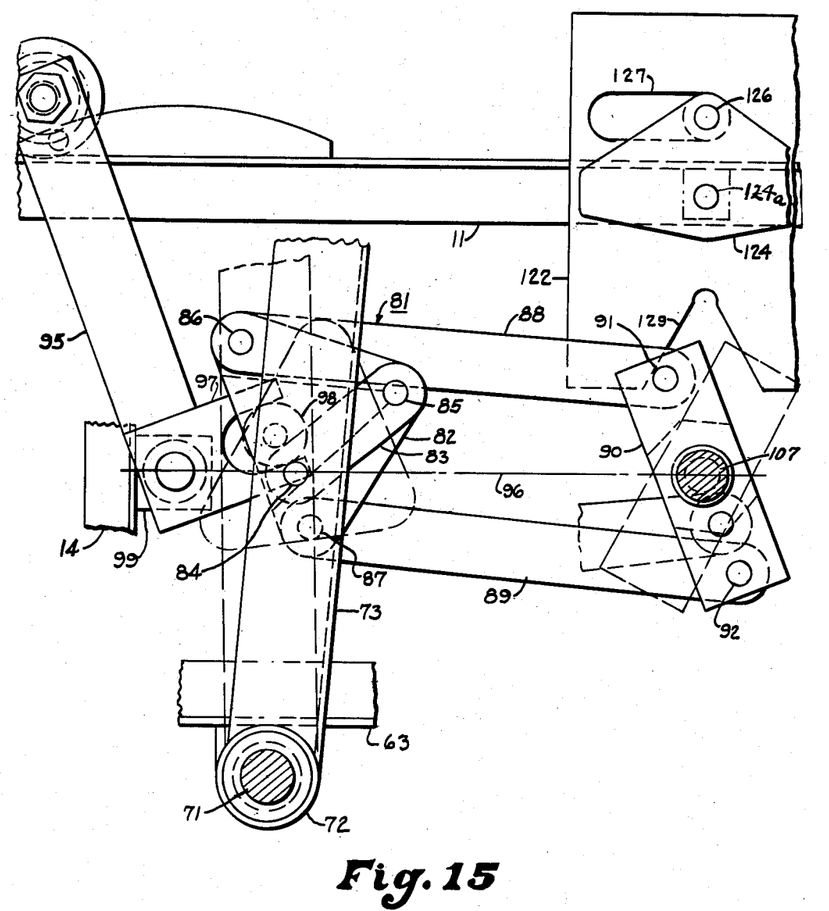
Fig. 15 is a view similar to view 14 but showing the crank arm and connected linkage in displaced positions and also showing the locking plate raised so that the body supporting portion of the table is maintained stationary.
Figure 16:
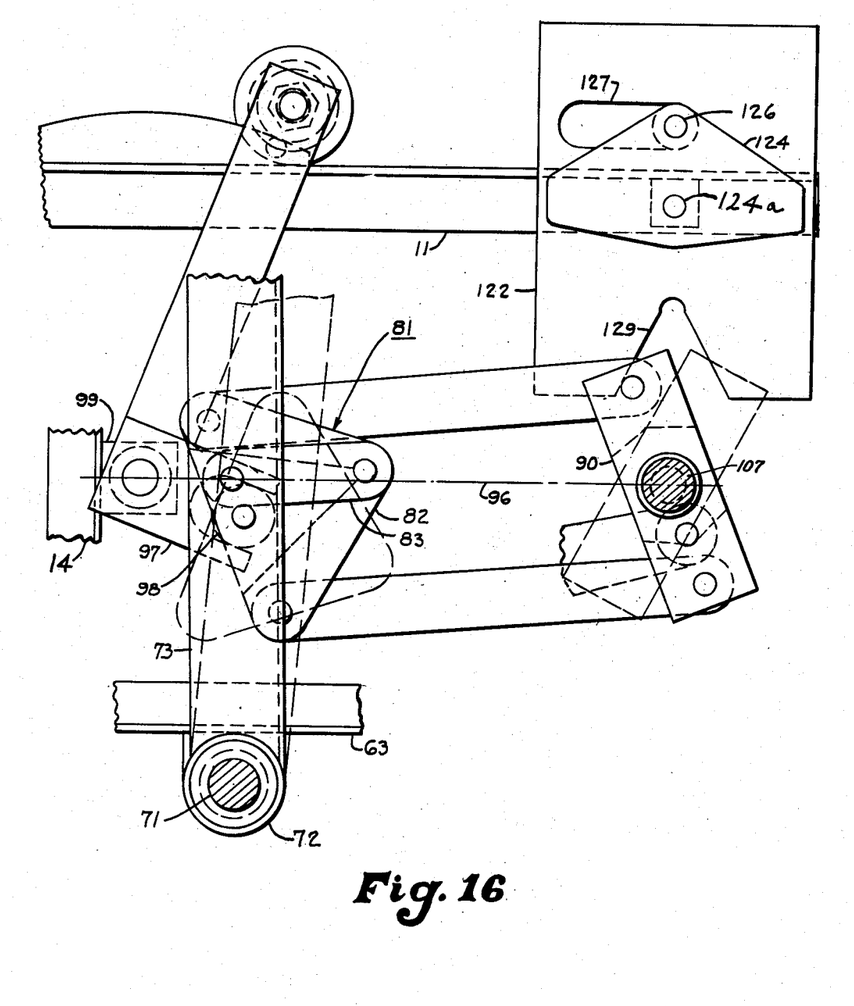
Fig. 16 is a view similar to Fig. 15 showing the effect of displaced positions of the rocker arm when the floating driving member is lowered instead of raised, but showing the locking plate raised from the position shown in Fig. 14.

The crank arm 90, Fig. 14, is rocked by and with a drive shaft 107 which is journaled in bearings supported by the cradle 30. The shaft 107 is rocked by a pitman or connecting rod 108 which is connected to the crank arm 90 and to eccentric 109a, Fig. 3. Power to drive the eccentric is supplied by an electric motor 110 connected therewith by the belts 111 and 112 and pulleys 113 and 109. In operation, since the crank arm 90 (Fig. 14) is connected at its midpoint to shaft 107, the rocking motion imparted to this shaft oscillates the crank arm 90, as indicated by the full and dotted line positions in Figs. 15 and 16. This movement of the crank arm alternately reciprocates the links 88 and 89 and at times causes plate 82 and link 83 to oscillate up and down about pivot pin 98 relative to plane 96.

Figure 9:
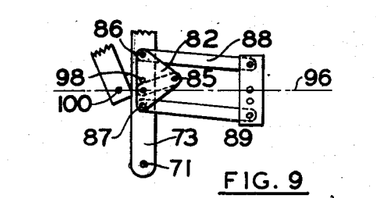
Fig. 9 is a view similar to Fig. 7 showing the shifting driving link in a raised position.
Figure 10:
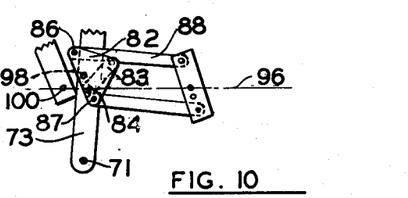
Fig. 10 is a view similar to Fig. 8 but also showing the driving link in a raised position.
Figure 11:
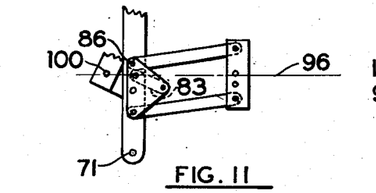
Fig. 11 is a view similar to Figs. 7 and 9 but showing the driving link in a lowered position.
Figure 12:
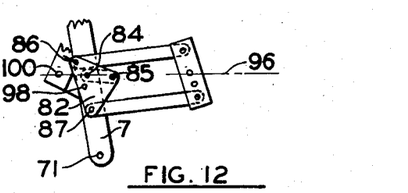
Fig. 12 is a view similar to Figs. 8 and 10 but showing the driving link also in a lowered position.

The oscillation of each plate 82 is controlled by the setting of the associated arm 95 and the position of the pivot pin 98. Thus, when the arm is locked in the positions shown in Figs. 7, 8 and 14, block 97 holds pin 98 aligned with pins 84 and 85 and with shaft 107 in plane 96. Reciprocation of links 88 and 89 then causes plate 82 and link 83 to swing equal distances both above and below the center line, i. e. plane 96. Link 83 swings equally about pin 84 and transmits no driving motion to member 73. When arm 95 is set in the position illustrated in Figs. 9, 10, and 15, pin 98 is swung upward relative to plane 96 and plate 82 raised. In this position the pivot pin 85 is held above plane 96 (Fig. 9). Then movement of the crank arm 90 counter-clockwise (Fig. 10) causes plate 82 to swing link 83 (pin 85) upwardly relative to the position shown in Fig. 9. This movement in turn causes member 73 to swing in a clockwise direction, i. e. opposite to the direction of the crank arm. That is, member 73 and crank arm 90 swing in opposite phase relations relative to each other. If it is desired to have member 73 swing in phase with the crank arm, arm 95 is adjusted to the position illustrated in Figs. 11, 12 and 16. This position of arm 95 lowers pin 98 and plate 82 relative to plane 96 as shown. The pivot pin 85 is held below plane 96. Then movement of crank arm 90 counter-clockwise (Fig. 12) causes plate 82 to swing link 83 (pin 85) upwardly relative to the position shown in Fig. 11. This movement of link 83 (pin 85) in turn causes member 73 to swing in a counter-clockwise direction, i. e. in the same direction as the crank arm.

The oscillation of the crank arm 90 is also utilized to reciprocate the cradle 30 and the body supporting surface 2. However, in order that the cradle 30 may not be oscillated when not desired or that the pads may not oscillate at improper times, we provide locking means. Referring to Fig. 4, it may be seen that the cradle 30 (which consists of frame members 32, 33, 34, 35, 61, 62, 63, 64, 65, 66, 67, 68 and 69) supports on one side of the machine a rear plate 120 to which is bolted a front plate 121, both of these plates being securely fastened to the cradle frame members 66 and 67 and front plate 121 being formed with an opening. These plates are maintained in spaced apart relation and form a guideway for the slidably mounted plate 122 shown more clearly in Figs. 13 to 16. A locking segment 124 is positioned in the opening in the plate 121 and is carried on a shaft 124a which is pivotally mounted in the main frame members 11. The shaft 124a is also provided with an operating lever 125. The locking segment 124 carries a pin 126 (see also Fig. 14) which engages in a slot 127 formed in the top of the plate 122. When the operating lever is in the position shown in Fig. 14, the locking segment 124 is rotated so that it is spaced from the sides of the opening in the plate 121 and the cradle may move forward and backward. At the same time the pin 126 is lowered (i. e. to the position shown in Fig. 14). Pin 126 accordingly holds plate 122 in the lowered position. Thereupon, the pads may not be operated. However, when the operating lever 125 is rotated 90° to the position shown in Figs. 4, 15 and 16, the locking segment 124 is rotated so that its greatest width contacts with the sides of the opening in the plate 121 and prevents the cradle from moving. At the same time pin 126 is raised (i. e. to the position shown in Figs. 15 and 16) and accordingly holds plate 122 in the raised position. Thereupon, the pads may be operated. If again the operating lever 125 is rotated back 90° from the position shown in Figs. 4, 15 and 16, the locking segment 124 and the pin 126 move to the position shown in Fig. 14. This allows oscillation of the cradle 30 inasmuch as play is provided between the opening in the plate 121 and the locking segment 124. This movement also lowers plate 122 relative to the member 11 as shown. Also, as shown in Fig. 14, the lower edge of the plate 122 is notched as indicated in Fig. 29. Thus, when the plate 122 is lowered the notched area 129 engages over the extending end of pin 91 of the crank arm 90. The oscillating movement of the crank arm is thus imparted to the plate to reciprocate the cradle. On the other hand, when the locking segment 124 is in the position shown in Figs. 15 and 16, the locking segment by contact with the sides of the opening in the plate 121 prevents the cradle 30 from moving relative to the main frame 10.

The operation of the device described above is as follows: The motor 110 supplies power to reciprocate the connecting rod 108 which in turn oscillates the drive shaft 107. The crank arms 90, one on each side of the machine, are thereby rocked or oscillated. This motion of the crank arms 90 may be utilized to reciprocate the cradle 30 and surface 2 in a horizontal plane or to swing the assemblies 3, 4, 5 and 6 and pad members 52, 53, 54 and 55 so that they oscillate in an arc about a horizontal axis.

The assemblies 3, 4, 5 and 6 including pad members 52, 53, 54 and 55 are driven from the crank arm 90 through the linkage 81 provided for each pad member. With the construction provided the pad members can be operated individually or as groups. For example, if it is desired to operate pad member 52 alone, arm 95 for this pad member is moved to either the right or left hand positions depending upon whether the pad member is to swing in or out of phase with the crank arm 90. Arms 95 for the other pad members, namely 53, 54 and 55, are adjusted so that the roller 101 are in the mid position on tracks 102. This sets the linkage plate 82 in the neutral position so that no driving power is transmitted to the assemblies 4, 5 and 6. These latter members then remain stationary while pad member 52 is being driven. If it is then desired to operate any one or all of the other pad members in conjunction with pad member 52, it is only necessary to move the arms 95 to shift the plate 82 from the neutral to a driving position. Any combination of pad members desired can thus be driven. Furthermore, the pad members can be operated to swing in or out of phase with respect to each other. Thus, for example, the arms 95 can be adjusted so that the pad members 52 and 53 swing together, i. e. both pads swing first clockwise then counter-clockwise, or they can be positioned so that these pad members swing opposite to each other, i. e. pad member 52 may be swinging clockwise while pad member 53 is swinging counter-clockwise or vice versa. Similarly, the movements of the other pad members can be controlled likewise. It is thus possible to have all of the pad members swinging in the same direction at one time or to have one of them or selected combinations of them swinging in different directions from the direction in which one or more of the others are swinging at one time.

From the above description, it will also be apparent that when the operator wishes to reciprocate the cradle 30, the arms 95 are all shifted to the neutral position so that no power is transmitted to drive the pad members. The plate 122 is then lowered until it engages with the crank arm 90. At the same time the locking segment 124 is turned to the position shown in Fig. 14 so that the plate 121 and the cradle 30 may oscillate relative thereto. The oscillation or rocking of the crank arm 90 is thereby transmitted through plate 122 to reciprocate the cradle. The cradle together with the pads 52, 53, 54 and 55 and the table top 2 are all reciprocated to give passive exercise and stimulation to the patient.

Figure 17:
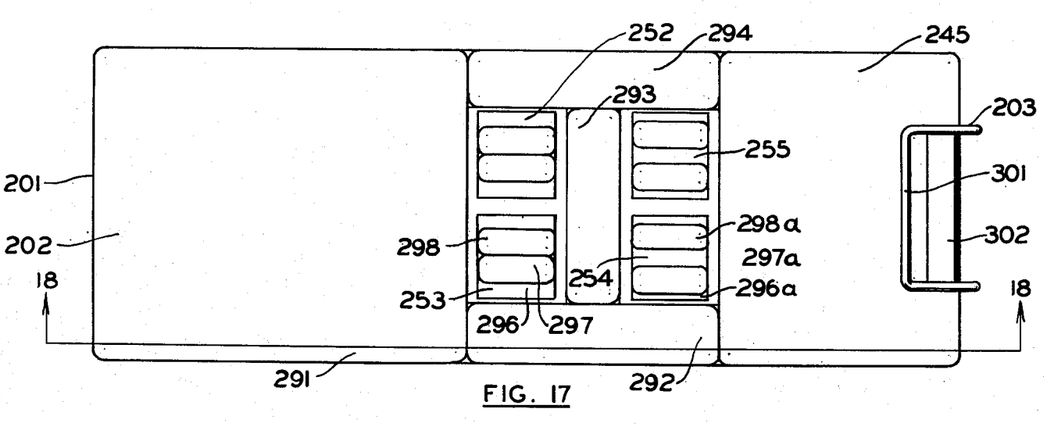
Fig. 17 is a view in plan of another form of exercise table which also embodies our invention.
Figure 18:
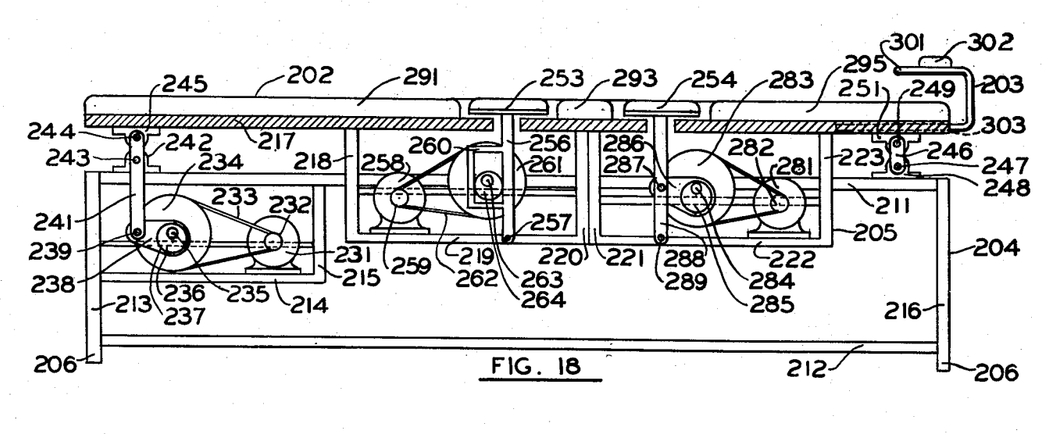
Fig. 18 is a somewhat schematic view in vertical section of the table of Fig. 17 taken substantially on the line 18—18 of Fig. 17.

In Figs. 17–24 inclusive we have shown another embodiment of our invention which we will now describe in detail. Referring first to Figs. 17 and 18, it may be seen that we have shown a table generally designated 201, having a top surface generally designated 202, a grip bar and foot rest generally designated 203, a supporting frame generally designated 204 and a floating frame generally designated 205. The main frame 204 is supported by feet 206. The floating frame 205 like the corresponding parts shown in Figs. 1–16 inclusive may also be designated a cradle and is adapted to be supported by but at the same time to be movable relative to the main frame 204.

The main frame 204 is made up of frame members such as 211, 212, 213, 214, 215 and 216 and the floating frame or cradle 205 is made up of frame members including the frame member 217, the box frame members 218, 219 and 220 and the second box frame members 221, 222 and 223. Of course, both the main frame 204 and the floating frame or cradle 205 include transverse frame members as well as the longitudinally and vertical members seen in Fig. 18. The member 217 may be a flat sheet of plywood to which the box members 218, 219 and 220, and 221, 222 and 223 are secured in any suitable manner.

Means are provided for oscillating the floating frame or cradle 205 and the body supporting top 202 longitudinally. These means comprise a motor 231 mounted in the box frame 214—215, driving a belt 233 from a small pulley 232. A large pulley 234 is driven by the belt and is carried by a shaft 235. The shaft 235 also carries an eccentric 236 disposed in a correspondingly shaped opening 237 in an arm or connecting rod 238. The opposite end of the arm 238 is pivotally connected as at 239 to a lever arm 241, pivoted in a bearing 242 as at 243. The upper end of the arm 241 is pivotally connected as at 244 in a bearing 245 secured to the top frame member 217. It thus may be seen that rotation of the motor 231 causes oscillation of the frame member 217 which is also pivoted by additional links (preferably at each corner of the frame member 217). For example, the link 246 is pivoted at its lower end as at 247 in a bearing 248 secured to the frame member 211 and at its upper end as at 249 in a bearing 251 secured to the frame member 217. As the cradle 205 is oscillated, it oscillates with it the box members 218—219—220 and 221—222—223, and thus the patient is oscillated with the table giving the patient a passive exercise which increases circulation and has valuable corrective effects in correcting the posture and normalizing the weight of the patient. The structure of the eccentric 36, the shaft 235, the pulley 234 are shown from another viewpoint in Fig. 23.

Figures 19, 20, 21, 22:
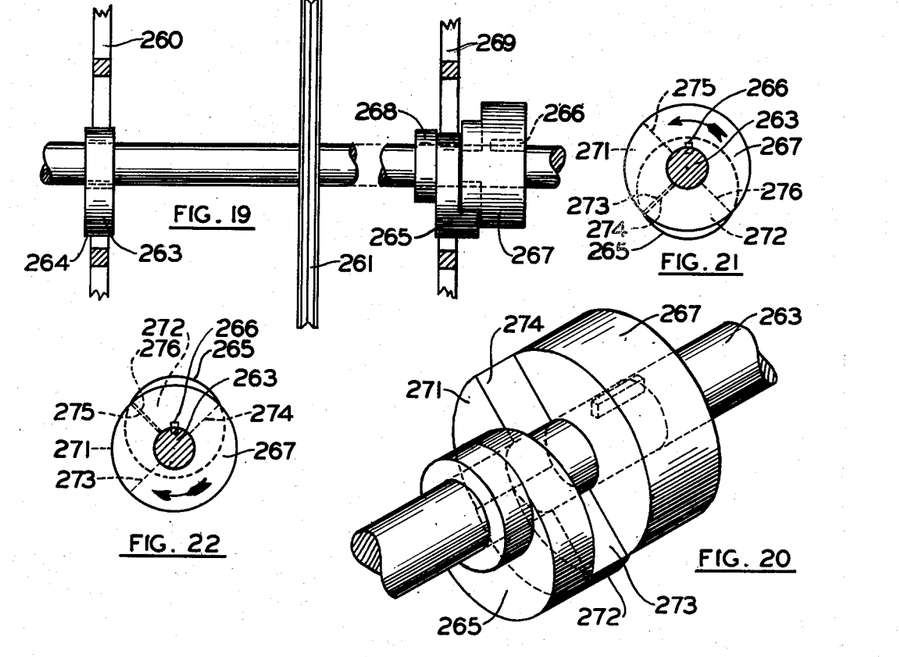
Fig. 19 is a fragmentary view in elevation of one of the driving shafts and the associated parts including the driven pulley mounted thereon and the cams also mounted thereon which are provided for the purpose of driving the pads.
Fig. 20 is a fragmentary view in perspective of one of the cams of Fig. 19 and the driver therefor which is shown secured to the driving shaft.
Fig. 21 is a more or less diagrammatic view in end elevation of the driving shaft of Fig. 19, of one of the cams, and of the driver therefor as the parts are arranged when the shaft is turning in a counter-clockwise direction.
Fig. 22 is a view similar to Fig. 21 but showing the driving shaft and the driver and the cam turning in a clockwise direction.
Figure 23:
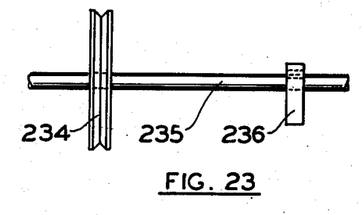
Fig. 23 is a view similar to Fig. 19 but on a slightly smaller scale showing details of the driving shaft and associated pulley and cam which are provided for oscillating the table as a whole.
Figure 24:
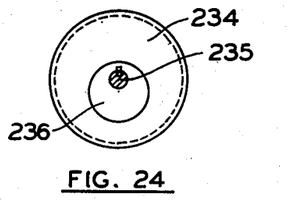
Fig. 24 is a view of the shaft of Fig. 23 in end elevation.

As may be also seen in Figs. 17 and 18, the top of the table is provided with a plurality of oscillatable paddles such as the paddles 252, 253, 254 and 255. Means are also provided for oscillating these paddles in substantially any desired combination of movements either (preferably and usually) while the cradle 205 is stationary, or possibly, if desired, while the cradle 205 is moving. For example, the paddle 253 may be oscillated as desired. The paddle 253 is carried at the top of a lever 256 pivoted at 257 on the box frame 218—219—220. The lever 256 is provided with a yoke 260 and is arranged to be driven by a motor 258. The motor 258 is provided with a pulley 259 of relatively small size which drives a relatively large size pulley 261 by means of a belt 262. Referring also to Fig. 19, as well as to Fig. 18, it may be seen that the pulley 261 is carried on a shaft 263 which also carries a cam 264. The cam fits within the yoke 257 and although the cam 264 is circular, it is mounted eccentrically on the shaft 263 and therefore as the motor 258 is energized, it operates to oscillate the paddle 253. The shaft 263 also carries a second cam 265 which is not secured to the shaft 263 but is rotatably mounted thereon in that the shaft passes through a closely fitting hole therein. There is secured to the shaft 263 as by a spline 266 a driver 267 for the cam 265. The cam 265 is maintained in position on the shaft 263 between the driver 267 and a collar 268 which is also secured to the shaft. The cam 265 is positioned in a yoke 269 which is secured to a lever not shown but in all respects similar to the lever 256 and which carries at its upper end the pad 252.

In order to explain the driving connection between the driver 267 and the cam 265, reference will be made also to Figs. 19, 20, 21 and 22. It may be seen that the driver 267 is in general circular and is mounted concentrically. The cam 265 is also circular but is mounted eccentrically. The driver 267 is formed with a lug 271 which is offset from the main body of the driver 267 and is formed in the shape of a ninety degree segment of the circle about the center of the shaft 263. The cam 265 is formed with a lug 272 which is also in the shape of a ninety degree segment of a circle about the center of the shaft 263 and which cooperates with the lug 271. When the shaft 263 is turning in a counter-clockwise direction as is shown in Fig. 21, the lug 271 drives the lug 272 at the surfaces 273 and 274 but when shaft 263 is turning in a clockwise direction, the lug 271 drives the lug 272 at the surfaces 275 and 276. Thus, it may be seen that the high points of the cams 264 and 265 are in alignment when the shaft 263 is turning counter-clockwise but that they are spaced 180° apart when the shaft 263 is turning clockwise. The effect of this is that when the shaft 263 is turning counter-clockwise, the paddles 252 and 253 are synchronized so that the two paddles move together but when the shaft 263 is turning in a clockwise direction, the paddles 252 and 253 are out of phase 180° and one is moving forward while the other is moving backwards, and vice versa.

The drive for the paddles 254 and 255 is in many respects similar to the driver for the paddles 252 and 253 except that instead of the cams driving the paddles through a yoke such as the yokes 260 and 269, it drives the paddles through links which are similar to the link 238. Thus, there is provided in the box frame 221—222—223 a motor 281 provided with a relatively small pulley 282 which drives a relatively large pulley 283. The pulley 283 is mounted on a shaft 284 which carries a pair of cams similar to the cams 264 and 265. The cam similar to 264 is shown in Fig. 18 as 285 and drives through a link 286 which is in all respects similar to the link 238. The opposite end of the link 286 to the cam 285 is pivotally connected as at 287 to a lever 288 which is pivotally mounted as at 289 on the box frame 221—222—223. The lever 288 carries at its upper end the pad 254. The pad 255 is carried by a lever in all respects similar to 288 which is driven by a link in all respects similar to 286; which is in turn driven by a cam which is in all respects similar to 265 and is mounted on the shaft 284 in a manner similar to that in which the cam 265 is mounted and which is driven by a driver secured to the shaft 284 in a manner similar to that in which the driver 267 is secured. The driver secured to the shaft 284 cooperates with a collar in all respects similar to 268 to position the cam for the pad 255.

The box unit including the frame members 218, 219 and 220, the motor 258, the pulley 261, the shaft 263, the supporting lever 256, and the pads 252 and 253 may be eliminated if desired. In such case, however, the design is such that at any time a box unit such as either a unit 218—219—220 or a unit 221—222—223, having a motor 281, a shaft 284, a lever 288 and pads 254 and 255 could be substituted. It is obvious that by reversing the position of either of these box units, either of such box units can be substituted for the other.

The body supporting top member 202 comprises the upper frame member 217 which is provided with upholstered pads such as 291, 292, 293, 294 and 295 for the comfort of the patient. Each of the paddles 252, 253, 254 and 255 comprises a supporting plate such as the supporting plates 296 and 296a and a pair of upholstered pads such as 297 and 298 and 297a and 298a. The pads 297 and 298 may be secured in any desired position laterally of the plate 296 and as shown may be moved laterally as desired from the positions shown in Fig. 17 so that they may be together as the pads 297 and 298 are shown or may be spaced apart as the pads 297a and 298a are shown. Thus the upholstered portions of the pad may be positioned at any desired place to provide for the comfort of the patient.

The bar 203 may readily be understood by reference to Figs. 17 and 18. It may be pointed out, however, that the bar 203 is provided with a portion 301 which the patient may grip during the stretching exercise, later to be described and is provided with an upholstered pad 302 on which the patient may at times rest his feet or the lower part of his legs. The lower portion of the bar 203 which is designated as 303 is releasably and slidably secured within the top frame member 217 so that it may be adjusted to any desired position dependent upon the length of the patient. Thus, the patient may properly be positioned on the table so that the exercise given by the paddles and the stretching operation may be most effective.

Our improved table is useful in a variety of ways to give passive exercise, to correct the posture of patients, and to normalize the weight of such patients. It performs the functions of three or more tables similar to those which have been previously considered as desirable. For instance, (1) it is capable of oscillating longitudinally to move the patient rapidly back and forth and thus induce a healthy circulation. It is capable also of giving a stretching exercise (2) to the patient lying on the table with the shoulders touching the pads 254 and 255. A similar stretching exercise (3) may be with the patient lying on the table with the thighs touching the pads 252 and 253. Similarly, a twisting and kneading of either the shoulders (4) or thighs (5) may be similarly accomplished with the pads 254 and 255 going in alternate directions or with the pads 253 and 252 going in alternate directions. Other exercises may be accomplished by various other combinations of the movement.

In the operation of the table to create the circulation inducing or oscillating movement of the patient, the motor 231 is operated with the patient lying upon the table with his or her head either adjacent to the stretcher bar 203 or alternately upon the pad 291. This causes an oscillation of the cradle 205, the top 217, and the pads 291, 292, 293, 294 and 295, and the pads 252, 253, 254 and 255 and the patient.

If it is desired to give a stretching exercise to the patient upward from the shoulders, or to massage the shoulder portion of the body, the patient may lie upon the table with the shoulders upon the pads 254, and 255, and gripping the bar 301. Then the motor 231 is turned on in a counter-clockwise direction with the result that the paddles 254 and 255 are reciprocated together and a beneficial stretching exercise is given to the patient. If it is desired that this stretching exercise shall be given from the shoulders to the hips, the motor 281 is left inoperative and the motor 258 is operated in a counter-clockwise direction which causes the paddles 252 and 253 to operate simultaneously and in synchronism giving a beneficial stretching exercise to the patient from the hips upward. If it is desired to give a twisting exercise to the shoulders with the subject lying in the same position the motor 281 is turned on in a clockwise direction with the result that the paddles 254 and 255 operate alternately and a massaging and twisting exercise is given which is highly beneficial. Similarly, if it is desired that the twisting and massaging exercise be given to the hips or buttocks portion of the patient the motor 258 is turned on in a clockwise direction with a result that the paddles 252 and 253 operate alternately and give a beneficial massaging and twisting exercise.

As stated above, if desired we may omit from the table the motor 258 and/or other portions of the mechanism shown in the box structure 218—219—220. Substantially the same exercises can be given in such case. The pads 252 and 253 may be retained as supports or a pad similar to pad 293 may be added to fill the space between the pads 291 and 293. In such case, the shoulder stretch (2), the shoulder massage (4), and the circulation inducing exercises (1) would be the same as described above. The hips massage and/or stretch or passive exercises for the pelvic region designed to relax tension in the entire spinal area (3) is accomplished with the patient turned in the opposite direction so that his or her head is on the pad 291 and her feet or ankles rest upon the pad 302. Also the exercise designed to free the muscles and the tendons of the sacroiliac region making it easy for the patient to assume a good posture and eventually overcome a pelvic dip and/or the hip twisting exercise is also performed with the patient lying with the head upon the pad 291 and the buttocks upon the movable pads 254 and 255.

It is to be understood that the above described embodiments of our invention are given for the purpose of illustration only and various changes from the details of the embodiments illustrated may be made without departing from the spirit and scope of the invention which is defined in the following claims.

We claim:

1. A body posture correcting machine comprising a main frame; a cradle supported on the main frame for movement back and forth substantially in a horizontal plane including a body support; a body contacting pad member pivotally mounted on said cradle for oscillating movement relative to said cradle; means for transmitting oscillating motion to move said pad member relative to said cradle; and means for transmitting movement to move said cradle and said body support relative to said main frame.

2. A body posture correcting machine comprising a main frame; a body supporting cradle positioned over and movable relative to the main frame; a body contacting pad member secured to and supported by said cradle and having a pivotal mounting providing for oscillating movement of the pad member relative to said cradle; and means for driving the pad member.

3. A body posture correcting machine comprising a main frame; a pair of oppositely disposed body contacting pad members each having a pivotal mounting providing for independent oscillating movement thereof; driving means; and a linkage for each said pad member for transmitting power from the driving means to drive said pad member comprising pivot, a link pivotally connected to said pivot and to the driving member, a second link pivotally connected to said pivot and to the body contacting pad member, and means for shifting the position of the pivot to provide for changing the alignment of the second link relative to the body contacting pad member whereby oscillating movement of the driving member is transmitted from the first link to swing said second link in a path causing the body contacting pad member to oscillate in a preselected direction relative to the frame.

4. A body posture correcting machine comprising a main frame; driving means; a cradle supported by the main frame; a pair of oppositely disposed body contacting pad members carried by said cradle, each of said members having a pivotal mounting providing for independent oscillating movement thereof; and means for transmitting power from said driving means to move each of said members independently including a driving member common to both said pad members which is connected to the prime mover, a linkage for each pad member comprising a pivot, a link pivotally connected to said pivot and to the driving member, a second link pivotally connected to said pivot and to said pad member for driving the latter, and means for shifting the position of the pivot to provide for changing the driving position of said second link relative to the pad member whereby movement imparted to the first link from the driving member causes the second link to drive the pad member in a preselected manner relative to the driving member.

5. A body posture correcting machine comprising a main frame; a driving member mounted thereon; a cradle supported by the main frame with connecting members providing for reciprocating motion of the cradle relative to said frame; a body contacting pad member pivotally mounted for oscillating movement; a linkage for transmitting oscillating motion from said driving member to said pad member including a pivot for the pad member which provides for controlling the direction in which the pad member oscillates relative to a predetermined directional movement of the driving member; and means for connecting said cradle to the driving member to provide for reciprocating said cradle.

6. A body posture correcting machine comprising a main frame; a driving member mounted thereon; a cradle supported by the main frame with connecting members providing for reciprocating motion of the cradle relative to said frame; a body contacting pad member pivotally mounted for oscillating movement; a linkage for transmitting oscillating motion from said driving member to said pad member including a pivot for the pad member which provides for controlling the direction in which the pad member oscillates relative to a predetermined directional movement of the driving member; and means for connecting said cradle to the driving member to provide for moving the same, including a shiftable element carried on the cradle and movable into and out of engagement with said driving member.

7. The structure of claim 1 in which there is provided a driving means, and a driving member oscillatably driven by the driving means and in which the means for transmitting oscillating motion to said pad member comprises a driven member by which said pad member is carried, a pivot, a pair of parallel links pivotally connected to the pivot and to said driving member, a third link pivotally connected to said pivot and to said driven member for driving the latter, and means for shifting the position of the pivot relative to said parallel links to provide for changing the driving position of the third link relative to the driven member whereby in one shifted position of the pivot, movement of the driving member causes the third lever to effect concurrent movement of the driven member and in another shifted position of the pivot, movement of the driving member causes the third link to effect opposite movement of the driven member.

8. In a body posture correcting machine having a main frame and a driven member mounted for oscillating movement and including a body contacting pad member; driving means having a driving member; a linkage for transmitting power from said driving member to oscillate said driven member comprising a pivot, a link pivotally connected to the pivot member and to said driving member, a second link pivotally connected to said pivot and to the said driven member for driving the latter, and means for shifting the position of the pivot to provide for changing the driving position of the second link relative to the driven member whereby movement of the driving member causes the second link to drive the pad member in a preselected manner relative to the driving member.

9. A body posture correcting machine comprising a main frame; driving means mounted thereon; a body contacting pad member having a pivotal mounting providing for oscillating movement thereof relative to the frame; a driving member connected between the driving means and pad member; means for transmitting power from said driving member to oscillate said pad member including a linkage comprising a pivot, a link pivotally connected to said pivot and to said driving member, and a second link pivotally connected to said pivot and to said pad member for driving the latter; and means for shifting the position of the pivot to provide for changing the driving position of said link relative to said pad member whereby movement imparted to the first link from the driving member causes the second link to drive the pad member in a preselected manner relative to the driving member.

10. A body posture correcting machine comprising a main frame; a driving means mounted thereon; a cradle supported by the main frame; a body contacting pad member having a pivotal mounting providing for oscillating movement thereof relative to the cradle and carried by said cradle; means for transmitting power from said driving means to oscillate said pad member including a linkage comprising a driving member oscillatably driven by said driving means; a pivot, a link pivotally connected to said pivot and to said driving member, and a second link pivotally connected to said pivot and to said pad member for driving the latter; and means for shifting the position of the pivot to provide for changing the driving position of the second link relative to the pad member whereby movement imparted to the first link from the driving member causes the second link to drive the pad member in a preselected manner relative to the driving member.

11. A body posture correcting machine comprising a main frame; a body supporting cradle positioned over and movable relative to the main frame; a body contacting pad member mounted on said cradle and having a pivotal mounting providing for oscillating movement of the pad member relative to said cradle; and a linkage for transmitting oscillating motion to said pad member relative to said cradle comprising means for driving the pad member which provides for controlling the direction in which the pad member moves.

12. The structure of claim 11 in which the means for driving the pad member for controlling the direction in which the pad member moves relative to the driving member comprises a pivot, a pair of parallel links connected to said pivot, a rocker arm connected to said pair of parallel links and a third link connecting said pivot and the pad member.

13. The structure of claim 11 in which the means for driving the pad member for controlling the direction in which the pad member moves relative to the driving member comprises a rotatable shaft; a cam rotatably mounted on said shaft and formed with an offset lug, consisting of a sector having an arc of less than 180°; and a driving collar secured to said shaft, and having on offset lug consisting of a sector having an arc of less than 180° which contacts with the lug on the cam and in which there is provided a reversible motor for driving said rotatable shaft.

14. The structure of claim 2 in which the means for driving the pad member comprises a pivot, a pair of parallel links connected to said shiftable driving element, a rocker arm connected to said pair of parallel links and a third link connecting said pivot and the pad member.

15. The structure of claim 2 in which the means for driving the pad member comprises a rotatable shaft; a cam rotatably mounted on said shaft and formed with an offset lug, consisting of a sector having an arc of less than 180°; and a driving collar secured to said shaft, and having an offset lug consisting of a sector having an arc of less than 180° which contacts with the lug on the cam and in which there is provided a reversible motor for driving said rotatable shaft.

16. The structure of claim 1 in which there is provided a driving means which is reversible so that it may be rotated in opposite directions, and in which the means for transmitting oscillating motion to said pad member comprises a driven member mounted for oscillating movement by which said pad member is carried, a rotatable shaft drivn by said driving means, a cam rotatably mounted on said shaft and formed with an offset lug consisting of a sector having an arc of at least 180°, a driving collar secured to said shaft and having an offset lug consisting of a sector having an arc of less than 180° which contacts with the lug on the cam; and a connection between said cam and said driven member.

WILLIAM R. ALEXANDER.
OWEN E. WILLIAMS.
HAROLD H. DAWSON.
HOWARD K. BENTZ.

References Cited in the file of this patent

UNITED STATES PATENTS

| Number | Name | Date |
|---|---|---|
| 1,602,196 | Iverson | Oct. 5, 1926 |
| 1,942,914 | Buck | Jan. 9, 1934 |
| 2,150,519 | Rogers | Mar. 14, 1939 |
| 2,262,271 | De Camp | Nov. 11, 1941 |
| 2,548,408 | Tammen | Apr. 10, 1951 |

FOREIGN PATENTS

| Number | Country | Date |
|---|---|---|
| 588,257 | Great Britain | May 19, 1947 |